United States Patent
Kondo et al.

(10) Patent No.: US 12,444,740 B2
(45) Date of Patent: Oct. 14, 2025

(54) CATHODE ACTIVE MATERIAL FOR LITHIUM ION SECONDARY BATTERY AND METHOD FOR PRODUCING SAME

(71) Applicant: SUMITOMO METAL MINING CO., LTD., Tokyo (JP)

(72) Inventors: Kentaro Kondo, Niihama (JP); Tetsufumi Komukai, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 1244 days.

(21) Appl. No.: 17/043,844

(22) PCT Filed: Apr. 1, 2019

(86) PCT No.: PCT/JP2019/014562
§ 371 (c)(1),
(2) Date: Oct. 29, 2020

(87) PCT Pub. No.: WO2019/194150
PCT Pub. Date: Oct. 10, 2019

(65) Prior Publication Data
US 2021/0111404 A1     Apr. 15, 2021

(30) Foreign Application Priority Data
Apr. 2, 2018   (JP) ................... 2018-070846

(51) Int. Cl.
*H01M 4/525* (2010.01)
*C01G 53/82* (2025.01)
(Continued)

(52) U.S. Cl.
CPC ............ *H01M 4/525* (2013.01); *C01G 53/82* (2025.01); *H01M 4/485* (2013.01); *H01M 4/505* (2013.01);
(Continued)

(58) Field of Classification Search
CPC ...... H01M 4/525; H01M 4/485; H01M 4/505; H01M 10/0525; H01M 2004/021;
(Continued)

(56) References Cited

U.S. PATENT DOCUMENTS

2015/0188136 A1* 7/2015 Mori ..................... H01M 4/525
429/223

FOREIGN PATENT DOCUMENTS

CN   102074679 A    5/2011
CN   103928671 B  * 6/2017 ............ H01M 4/505
(Continued)

OTHER PUBLICATIONS

EPO English Machine Translation of CN 103928671, originally published to Chao Fenggang on Jul. 16, 2014 (Year: 2014).*
(Continued)

*Primary Examiner* — Allison Bourke
*Assistant Examiner* — Dustin Van Kirk
(74) *Attorney, Agent, or Firm* — Troutman Pepper Locke LLP; James E. Armstrong, IV; Nicholas J. DiCeglie, Jr.

(57) ABSTRACT

The cathode active material for a lithium ion secondary battery is produced from spherical particles made of lithium nickel cobalt composite oxide represented by general formula: $Li_zNi_{1-x-y}Co_xM_yO_2$ (wherein M is at least one element selected from among Mn, V, Mg, W, Mo, Nb, Ti, and Al and x, y, and z satisfy $0<x\leq0.35$, $0\leq y\leq0.35$, and $0.97\leq z\leq1.20$, respectively) and having a volume average particle diameter MV in a range of preferably 8 to 30 μm, wherein an area ratio of a lithium compound unevenly distributed on surfaces of the particles in a SEM image is 5% or less. The spherical particles preferably have a crystallite diameter in a range of 50 to 200 Å as determined from a full
(Continued)

width at half maximum, FWHM of diffraction peak of (003) plane obtained by X ray diffraction by using Sherrer formula.

4 Claims, 3 Drawing Sheets

(51) Int. Cl.
    *H01M 4/485*      (2010.01)
    *H01M 4/505*      (2010.01)
    *H01M 10/0525*      (2010.01)
    *H01M 4/02*      (2006.01)

(52) U.S. Cl.
    CPC ..... *H01M 10/0525* (2013.01); *C01P 2002/60* (2013.01); *C01P 2004/03* (2013.01); *C01P 2004/32* (2013.01); *H01M 2004/021* (2013.01)

(58) Field of Classification Search
    CPC .. C01G 53/82; C01P 2002/60; C01P 2004/03; C01P 2004/32
    See application file for complete search history.

(56) References Cited

FOREIGN PATENT DOCUMENTS

| | | |
|---|---|---|
| JP | H07-114915 A | 5/1995 |
| JP | H11-111290 A | 4/1999 |
| JP | 2000-133249 A | 5/2000 |
| JP | 2007-119266 A | 5/2007 |
| JP | 2011-146309 A | 7/2011 |

OTHER PUBLICATIONS

Office Action mailed Jul. 19, 2022, issued for Chinese Patent Application No. 201980024587.0.
International Search Report mailed Jul. 2, 2019, issued for PCT/JP2019/014562.

\* cited by examiner

[Fig.1]
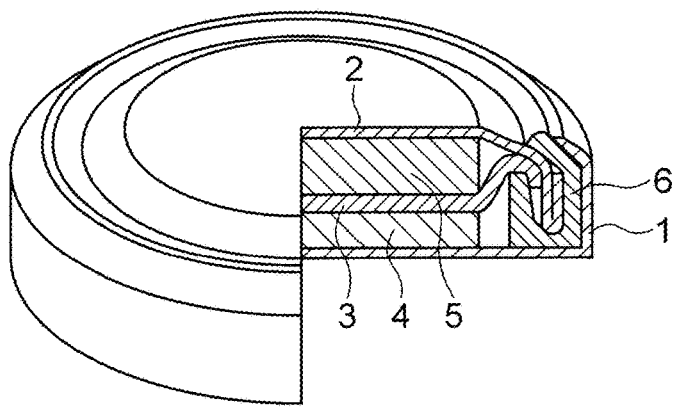
[Fig.2]
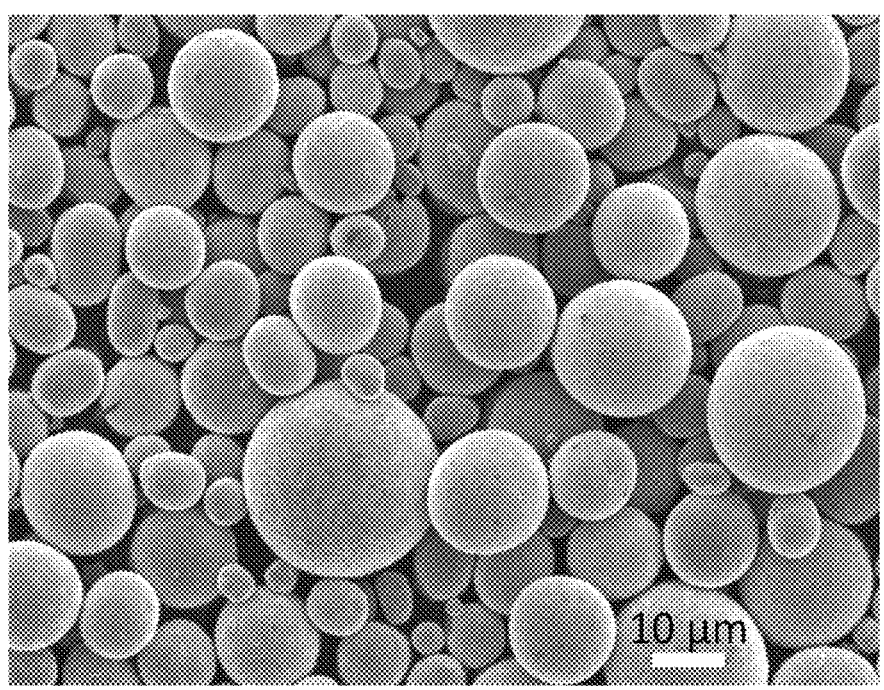

[Fig.3]
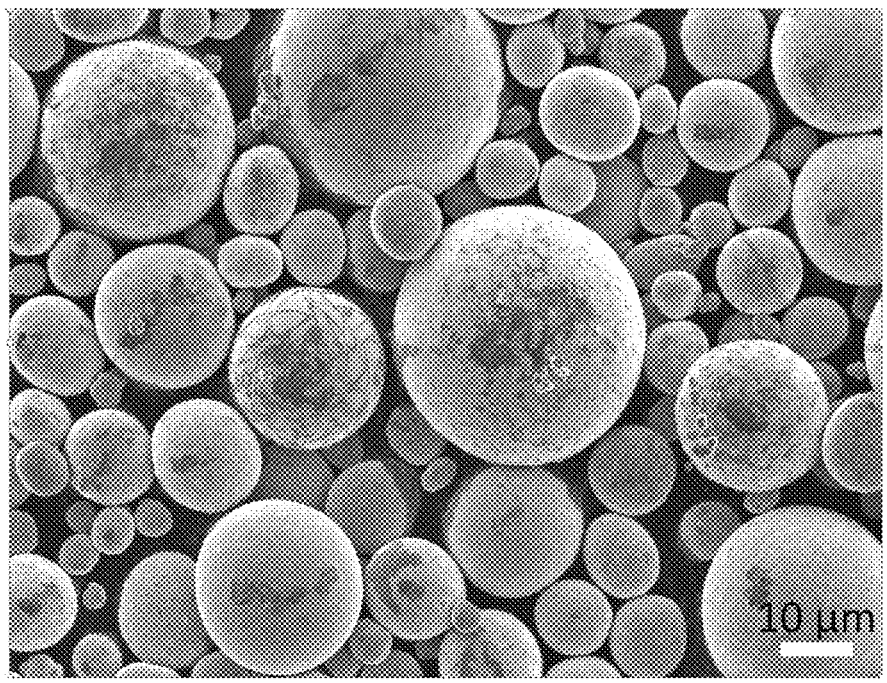
[Fig.4]
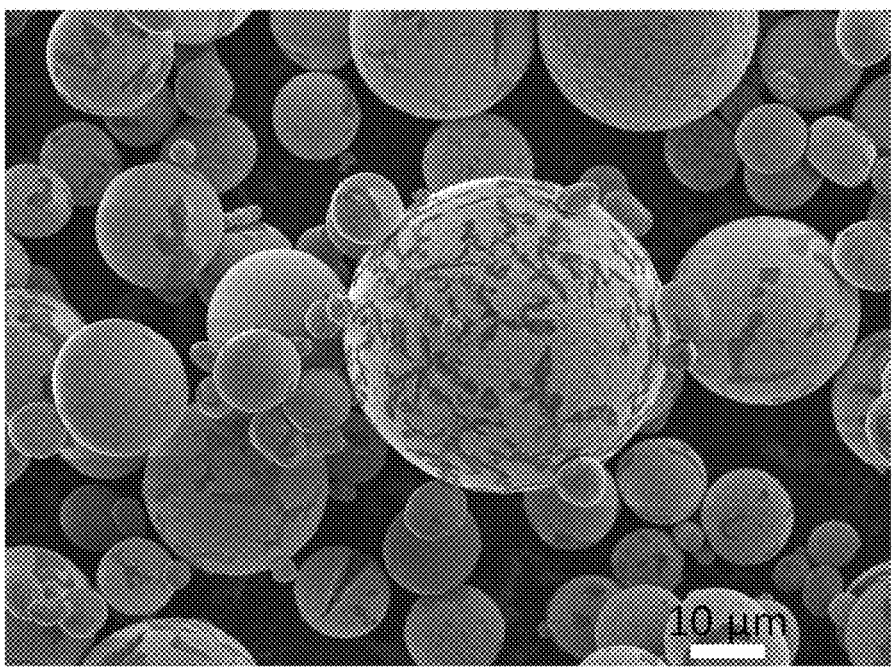

[Fig.5]
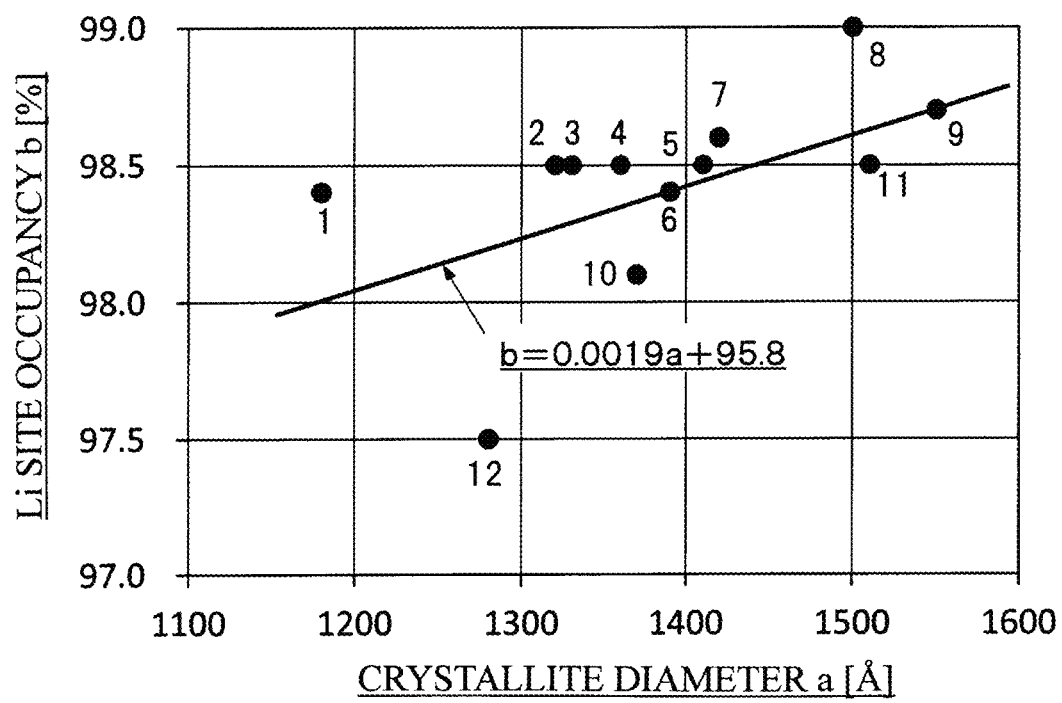

CATHODE ACTIVE MATERIAL FOR LITHIUM ION SECONDARY BATTERY AND METHOD FOR PRODUCING SAME

TECHNICAL FIELD

The present invention relates to a cathode active material for a lithium ion secondary battery and a method for producing the same, and particularly relates to a cathode active material for a lithium ion secondary battery which is produced from spherical particles made of a cobalt-containing lithium nickel-based composite oxide as an intermediate raw material and a method for producing the same.

BACKGROUND ART

Along with recent popularization of small information terminals such as smartphones and tablet PCs, there has been a growing demand for small and lightweight secondary batteries having high energy density. Also in the field of electric cars such as hybrid cars, there has been a growing demand for high-output secondary batteries. In these fields, non-aqueous electrolyte secondary batteries have attracted attention. Particularly, lithium ion secondary batteries are now being actively researched and developed which use materials where lithium can be inserted and de-inserted as an anode active material and a cathode active material. Among them, lithium ion secondary batteries using a layered or spinel-type lithium nickel composite oxide as a cathode material can deliver a high voltage of about 4 V and have high energy density, and therefore have already been put to practical use in various fields. Further, all-solid-state lithium ion secondary batteries whose cathodes, anodes, and electrolytes are all in a solid state are expected to be put to practical use in the future.

Examples of major cathode materials that have heretofore been proposed include lithium cobalt composite oxides ($LiCoO_2$) that can relatively easily be synthesized, lithium nickel composite oxides ($LiNiO_2$) using nickel that is a metal cheaper than cobalt, lithium manganese composite oxides ($LiMn_2O_4$) using manganese, and lithium nickel cobalt manganese composite oxides ($LiNi_{1/3}Co_{1/3}Mn_{1/3}O_2$) containing all of them. Among them, lithium nickel-based composite oxides containing nickel such as lithium nickel composite oxides, lithium nickel cobalt manganese composite oxides, and lithium nickel cobalt aluminum composite oxides obtained by replacing part of nickel with cobalt and aluminum are actively used as next-generation cathode materials because such lithium nickel-based composite oxides have advantages that their capacities are higher than those of lithium cobalt composite oxides which are now mainly used and that nickel as a raw material is cheaper than cobalt and is stably available.

For example, Patent Literatures 1 to 5 disclose methods for producing such lithium nickel-based composite oxides as described above, in which a lithium compound and a nickel compound are mixed and subjected to thermal treatment. These Patent Literatures 1 to 5 disclose techniques to specify the temperature and retention time of the thermal treatment, an atmosphere during the thermal treatment, etc. in order to, for example, improve the characteristics of a secondary battery, such as discharge capacity.

More specifically, Patent Literature 1 discloses a method for producing a cathode active material, in which a lithium composite oxide is preferably subjected to first firing treatment at a firing temperature of 450 to 800° C. for 3 to 100 hours, then subjected to second firing treatment at a temperature higher than the temperature of the first firing treatment by 50 to 600° C. for 0.5 to 50 hours, and then cooled at a cooling rate of 0.1 to 25° C./min.

Patent Literature 2 discloses a method for producing a cathode material for a lithium secondary battery, in which a starting material containing a hydroxide is subjected to firing treatment at preferably 550 to 700° C. by heating at a temperature rise rate of 300° C./min or more and then subjected to thermal treatment at preferably 700 to 900° C. for 4 to 20 hours in an oxidizing atmosphere. Patent Literature 3 discloses a method for producing a cathode active material for a lithium secondary battery, in which a nickel compound, a non-nickel-based metal compound, and a lithium compound are subjected to first firing in a gas stream by gradually increasing a temperature over 1 hour or longer and maintaining a reaction temperature at 430 to 550° C. for 10 minutes or longer, and then subjected to second firing in a gas stream by maintaining a reaction temperature at 700 to 850° C. for 20 hours or longer.

Patent Literature 4 discloses a method for producing lithium nickel oxide useful as a cathode material of a lithium ion secondary battery, in which a mixture of a Ni compound and a Li compound as a starting material is subjected to first firing in a non-oxidizing atmosphere at 618° C. or lower and then subjected to second firing in an oxidizing atmosphere at 618° C. or higher. Patent Literature 5 discloses a method for efficiently producing a cathode active material for a non-aqueous electrolyte secondary battery, in which a mixture having a bulk density of 1.0 to 2.2 g/mL obtained by mixing a nickel composite compound having an average particle diameter of 8 to 20 μm with a lithium compound is fired in an oxidizing atmosphere at 550 to 650° C. for a retention time determined using the depth of the mixture filled in a firing container as a parameter.

CITATION LIST

Patent Literature

Patent Literature 1: JP 7-114915 A
Patent Literature 2: JP 11-111290 A
Patent Literature 3: JP 2000-133249 A
Patent Literature 4: JP 2007-119266 A
Patent Literature 5: JP 2011-146309 A

SUMMARY OF INVENTION

Technical Problem

It is considered that cathode active materials excellent in battery characteristics such as cycle characteristics and discharge capacity can be produced by the techniques disclosed in Patent Literatures 1 to 5 described above. However, with the increasing range of uses for lithium ion secondary batteries, it is required to produce cathode active materials having more excellent battery characteristics in a highly efficient manner. Under such circumstances, it is an object of the present invention to provide a method for efficiently producing a cathode active material for a lithium ion secondary battery excellent in battery performance such as initial discharge capacity.

Solution to Problem

In order to achieve the above object, the present invention is directed to spherical particles made of a lithium nickel cobalt composite oxide represented by a general formula:

Li$_z$Ni$_{1-x-y}$Co$_x$M$_y$O$_2$ (wherein M is at least one element selected from among Mn, V, Mg, W, Mo, Nb, Ti, and Al and x, y, and z satisfy 0<x≤0.35, 0≤y≤0.35, and 0.97≤z≤1.20, respectively), wherein an area ratio of a lithium compound unevenly distributed on surfaces of the particles in a SEM image is 5% or less.

The present invention is also directed to a method for producing spherical particles made of a lithium nickel cobalt composite oxide, the method including: filling a firing container with a mixture having a bulk density of 1.0 to 2.2 g/mL obtained by mixing a nickel cobalt composite compound having a volume average particle diameter MV in a range of 8 to 30 μm with a lithium compound; and subjecting the mixture to preliminary firing by maintaining a firing temperature at 500° C. or higher and 600° C. or lower for 30 minutes or longer and 5 hours or shorter.

Advantageous Effects of Invention

According to the present invention, it is possible to produce a cathode active material for a lithium ion secondary battery excellent in battery performance with high productivity.

BRIEF DESCRIPTION OF DRAWINGS

FIG. 1 is a partially cutaway perspective view of a coin-type battery produced using a cathode active material according to an embodiment of the present invention as a cathode material.

FIG. 2 is a SEM image of surfaces of spherical particles produced in Example 1 of the present invention.

FIG. 3 is a SEM image of surfaces of spherical particles produced in Example 1 of the present invention as a specific example for comparison.

FIG. 4 is a SEM image of surfaces of spherical particles produced in Example 1 of the present invention as another specific example for comparison.

FIG. 5 is a graph obtained by plotting the crystallite diameters [Å] and lithium site occupancies [%] of cathode active materials produced in examples.

DESCRIPTION OF EMBODIMENTS (1) Cathode Active Material for Lithium Ion Secondary Battery and Method for Producing Same Hereinbelow, a cobalt-containing lithium nickel-based composite oxide used for a cathode active material for a lithium ion secondary battery according to an embodiment of the present invention and a method for producing the same will be described in detail. When a lithium nickel-based composite oxide that is a cathode material for a lithium ion secondary battery as a typical non-aqueous electrolyte secondary battery is industrially produced, generally, a mixture as a raw material of the composite oxide is filled in ceramic firing containers, and the firing containers filled with the mixture are continuously sent into a firing furnace such as a roller hearth kiln or a pusher furnace to perform firing at a predetermined firing temperature for a predetermined time. This makes it possible to cause a synthetic reaction represented by the following formula 1 to generate the composite oxide. It is to be noted that a batch-type electric furnace capable of controlling an atmosphere in a batchwise manner during firing may be used to achieve more preferred firing conditions.

$$2NiO+2LiOH+1/2O_2 \rightarrow 2LiNiO_2+H_2O \quad \text{[Formula 1]}$$

In such production of the composite oxide, the firing time may be shortened by increasing the conveyance speed of the firing containers such as saggers in the firing furnace to improve the productivity of the composite oxide. However, an excessive increase in the conveyance speed may cause a problem that heat required for the synthetic reaction is not sufficiently conducted so that battery performance degrades due to the generation of a portion where the synthetic reaction does not proceed. The synthetic reaction may be promoted by increasing the firing temperature, but if the firing temperature is excessively increased, cation mixing is likely to occur so that ions of a constituent metal element other than lithium are present in sites where lithium ions should be present in a lithium nickel-based composite oxide crystal by replacement. As a result, the occupancy of lithium at 3a sites determined by Rietveld analysis of X ray diffraction reduces, which may cause a problem that battery performance degrades. Therefore, in order to prevent the degradation of battery performance, it is necessary to apply heat required for the synthesis reaction of a lithium nickel-based composite oxide to the mixture in a temperature range where cation mixing is less likely to occur.

The present inventors have intensively studied on the basis of the above findings, and as a result have found that a lithium ion secondary battery excellent in battery characteristics can be produced by using a cobalt-containing lithium nickel-based composite oxide as a cathode active material which is produced by mixing a nickel cobalt composite compound and a lithium compound in a predetermined mixing ratio, subjecting the mixture to preliminary firing under predetermined firing conditions, and then subjecting the mixture to final firing.

More specifically, a nickel cobalt composite compound and a lithium compound are mixed to obtain a mixture having a bulk density of 1.0 to 2.2 g/mL, the mixture filled in a firing container is subjected to preliminary firing by being maintained at a firing temperature within the range of 500° C. or higher and 600° C. or lower for 30 minutes or longer and 5 hours or shorter, and then spherical particles as a precursor made of a lithium nickel cobalt composite oxide produced by the preliminary firing are subjected to final firing by being maintained at a firing temperature within the range of 680° C. or higher and 780° C. or lower, preferably 700° C. or higher and 760° C. or lower for 3 hours or longer and 6 hours or shorter. This makes it possible to very efficiently generate particles having high crystallinity.

The reason why particles having high crystallinity can efficiently be generated by two firing treatments consisting of preliminary firing and final firing is because the melted lithium compound more effectively diffuses in an infinite number of pores of the nickel cobalt composite compound in preliminary firing performed under the above-described thermal treatment conditions, and therefore a temperature can be increased and maintained as high as possible within a temperature range lower than a thermal treatment temperature at which cation mixing is likely to occur in subsequent final firing. It is to be noted that the precursor may be used as a cathode active material without being subjected to final firing as long as it satisfies desired battery performance.

The particles having high crystallinity refer to particles whose lithium site occupancy per crystallite diameter is high. In production of lithium nickel-based composite oxide particles, the crystallite diameter usually increases gradually as the firing temperature increases, and accordingly, the lithium site occupancy also increases. However, cation mixing becomes remarkable when the firing temperature exceeds a certain temperature, and therefore the lithium site occupancy does not increase, that is, tends to remain at the same level or decrease. An excessive increase in the crystallite diameter is not preferred because the cycle characteristics and safety of a lithium ion secondary battery may degrade.

On the other hand, particles of a cobalt-containing lithium nickel-based composite oxide (also simply referred to as a lithium nickel cobalt composite oxide) produced by the production method including preliminary firing and final firing according to the embodiment of the present invention can have a high lithium site occupancy while the crystallite diameter is kept small to some extent. This makes it easy to conduct heat to the insides of primary particles, and therefore a problem caused by poor firing is less likely to occur.

Further, use of the production method according to the embodiment of the present invention makes it easy to diffuse the lithium compound into the nickel cobalt composite compound, thereby obtaining primary particles whose insides are almost uniform. It is to be noted that the crystallite refers to a maximum region that can be regarded as a single crystal, and the crystallite diameter refers to the average diameter of the crystallites as determined by XRD or the like. A primary particle may be constituted from an aggregate of a plurality of crystallites, and therefore a crystallite diameter is not always the same as a primary particle size. However, it can be considered that a crystallite diameter bears a proportional relationship to a primary particle size as long as the primary particle size is sufficiently small.

Further, use of the production method according to the embodiment of the present invention makes it possible to increase a temperature rise rate when a temperature is increased to the firing temperature of final firing after preliminary firing, thereby improving productivity due to a reduction in the total firing time of preliminary firing and final firing. The reason for this is because maintaining the above-described firing temperature for the above-described time in preliminary firing of the mixture filled in a firing container permits the melted lithium compound to favorably diffuse into nickel cobalt composite compound particles, and as a result, the lithium compound is almost uniformly distributed throughout the nickel cobalt composite compound particles, and therefore lithium nickel cobalt composite oxide particles excellent in lithium site occupancy per crystallite diameter can be obtained even when a temperature rise rate is increased. A battery having high discharge capacity and excellent battery performance can be produced by performing final firing within the above temperature range where cation mixing is less likely to occur after such preliminary firing.

More specifically, although depending on the kind of lithium compound, a liquid-solid phase reaction between the melted lithium compound and the nickel cobalt composite compound in particle form most remarkably proceeds by setting a firing temperature during preliminary firing to a value within the range of 500° C. or higher and 600° C. or lower. Therefore, the above-described lithium nickel cobalt composite oxide that contributes to excellent battery performance can be generated as long as the retention time during which the above-described firing temperature is maintained is 30 minutes or longer required to diffuse the melted lithium compound to the centers of the nickel cobalt composite compound particles.

For example, when a temperature is increased to perform preliminary firing on a mixture of lithium hydroxide and a nickel cobalt composite oxide as a raw material, the reaction of the mixture starts at about 450° C. The melting point of lithium hydroxide is about 480° C., and therefore when the temperature of the mixture is increased to this temperature, lithium hydroxide melts and reacts with the particulate nickel cobalt composite oxide. However, if the preliminary firing temperature is lower than 500° C., the migration speed of lithium hydroxide as a lithium compound for diffusion to the centers of the nickel cobalt composite oxide particles is low, and therefore the lithium compound failing to diffuse is unevenly distributed on the surfaces of the nickel cobalt composite oxide particles. Such a lithium compound unevenly distributed on the surfaces of the nickel cobalt composite oxide particles becomes a barrier to generation of a uniform lithium nickel cobalt composite oxide in subsequent final firing, and does not contribute to a charge and discharge reaction so that battery performance degrades.

On the other hand, when the preliminary firing temperature is higher than 600° C., crystal growth of a lithium nickel cobalt composite oxide starts before the melted lithium compound diffuses into the nickel cobalt composite oxide particles, and therefore diffusion of the lithium compound to the centers of the nickel cobalt composite oxide particles does not sufficiently proceed. Also in this case, the lithium compound failing to be incorporated into the nickel cobalt composite oxide is unevenly distributed on the surfaces of the nickel cobalt composite oxide particles, and therefore becomes a barrier in final firing similarly to the above case and does not contribute to a charge and discharge reaction so that battery performance degrades.

On the other hand, as described above, when a mixture of a lithium compound and a nickel cobalt composite compound is subjected to preliminary firing by being maintained at a firing temperature within the range of 500° C. or higher and 600° C. or lower for 30 minutes or longer and 5 hours or shorter, it is possible to obtain spherical precursor particles in which the melted lithium compound is almost uniformly distributed in particles of the nickel cobalt composite compound. Therefore, the spherical precursor particles can efficiently be subjected to firing treatment in subsequent final firing, thereby generating a lithium nickel cobalt composite oxide for a cathode active material excellent in battery characteristics.

More specifically, a crystallite diameter determined from the full width at half maximum, FWHM of diffraction peak of (003) plane obtained by X ray diffraction by using Sherrer formula is allowed to fall within the range of 50 to 200 Å (5 to 20 nm). Further, it is possible to prevent the melted lithium compound from remaining on the surfaces of lithium nickel cobalt composite oxide particles obtained after preliminary firing in a state where the melted lithium compound is unevenly distributed in a patchy fashion. More specifically, the area ratio of the lithium compound unevenly distributed in a patchy fashion on the surfaces of the lithium nickel cobalt composite oxide particles in a SEM image can be made 5% or less, preferably 2% or less. It is to be noted that an atmosphere during the preliminary firing is preferably an oxidizing atmosphere having an oxygen concentration of 80 vol % or more. This makes it possible to perform firing while suppressing the side decomposition reaction of a lithium nickel cobalt composite oxide, thereby highly efficiently synthesizing a lithium nickel cobalt composite oxide.

Further, the bulk density of the mixture of a nickel cobalt composite compound and a lithium compound is preferably in the range of 1.0 to 2.2 g/mL. If the bulk density is less than 1.0 g/mL, the mass of the mixture that can be filled into a firing container becomes too small relative to the size of the firing container, which may significantly reduce productivity. On the other hand, if the bulk density exceeds 2.2 g/mL, the mixture is too densely packed in a firing container so that oxygen is less likely to be distributed throughout the inside of the mixture. This may also reduce productivity because firing time needs to be increased to complete a reaction inside the mixture.

Further, the nickel cobalt composite compound particles used as a raw material of the mixture preferably have a volume average particle diameter MV in the range of 8 to 30 μm. If the volume average particle diameter MV is less than 8 μm, particle diameters of obtained cathode active materials become small, and therefore the amount of the cathode active material filled per unit volume becomes small when a cathode plate is produced which may reduce a battery capacity. Further, sintering is likely to occur during firing so that coarse cathode active material particles are generated which may degrade battery characteristics. On the other hand, if the volume average particle diameter MV exceeds 30 μm, the number of contact points between cathode active material particles becomes small so that the resistance of a cathode increases which may reduce a battery capacity. Further, if the volume average particle diameter MV of the nickel cobalt composite compound exceeds 30 μm, heat is less likely to be conducted to the insides of the particles during firing so that poor firing is likely to occur, which may result in a degradation of battery characteristics. Particularly, decomposition of a lithium nickel-based composite oxide starts at a temperature lower than that at which decomposition of a lithium cobalt composite oxide starts, and therefore it is difficult to increase a firing temperature during synthesis by firing. This further increases firing time that is originally long, which may become a major problem for productivity. It is to be noted that the volume average particle diameter MV is measured with a laser diffraction particle size distribution measuring instrument.

Further, the nickel cobalt composite compound particles used as a raw material of the mixture preferably have a specific surface area as measured by the BET method of 30 to 60 m$^2$/g. If the specific surface area is less than 30 m$^2$/g, the melted lithium compound is less likely to diffuse into the particles which may reduce productivity. On the other hand, if the specific surface area exceeds 60 m$^2$/g, the mechanical strength of the particles reduces which may degrade the performance of a cathode active material.

After the preliminary firing, as described above, the spherical particles as a precursor are subjected to final firing in an oxidizing atmosphere by being maintained at a firing temperature of 680° C. or higher and 780° C. or lower for 3 hours or longer and 6 hours or shorter so that a lithium nickel cobalt composite oxide having a suitable crystallite diameter and a high lithium site occupancy can be produced. More specifically, a crystallite diameter determined from the full width at half maximum, FWHM of diffraction peak of (003) plane obtained by X ray diffraction by using Sherrer formula is allowed to fall within the range of 1000 to 1600 Å (100 to 160 nm), and a lithium site occupancy at 3a sites determined by Rietveld analysis of an X ray diffraction pattern can be made 97% or more. Further, when the crystallite diameter [Å] is defined as a and the lithium site occupancy [%] is defined as b, a and b can satisfy a relational expression represented by b≥0.0019a+95.8.

If the firing temperature of the final firing is lower than 680° C., the crystallite diameter size becomes too small so that the diffusion resistance of lithium ions during charge and discharge increases due to an increase in the number of interfaces between crystallites, which may degrade battery performance. On the other hand, if the firing temperature is higher than 780° C., the crystallite diameter becomes too large so that fracture is likely to occur inside the particles due to expansion and shrinkage of the particles during repeated charge and discharge. If such fracture occurs, independent particles not contributing to charge and discharge are formed, which may degrade battery performance. It is to be noted that the firing temperature can be measured by using a thermocouple, and the crystallite diameter can be measured by X-ray diffraction.

In the final firing, particles having high crystallinity can be synthesized without particularly impairing battery performance by performing firing for a long time more than a certain amount of time. However, firing time is preferably as short as possible from the viewpoint of industrial productivity. Therefore, in the final firing, the highest temperature is set to 780° C. so that a firing temperature is maintained within a temperature range where cation mixing is less likely to occur for 3 hours or longer and 6 hours or shorter. Further, in the embodiment according to the present invention, the time from when the mixture filled in a firing container enters into a firing furnace until when the mixture gets out of the furnace after subjected to preliminary firing treatment and final firing treatment, that is, the time of the whole process from the start of heating for maintaining the mixture at a preliminary firing temperature for a predetermined time and then at a final firing temperature for a predetermined time to cooling of a product having been subjected to firing treatment to 150° C. or lower is preferably 20 hours or shorter. On the other hand, a rapid increase in temperature easily makes the temperature of the mixture in a firing container non-uniform, which may result in a non-uniform synthetic reaction during firing. Therefore, the time from the start of heating to cooling to 150° C. or lower is preferably 8 hours or longer.

The kind of lithium compound used as one of raw materials of the mixture is not particularly limited, but lithium hydroxide or lithium carbonate or one of hydrates thereof is preferred, and lithium hydroxide having a melting point of about 480° C. or a hydrate thereof is more preferred in consideration of a reaction with the nickel cobalt composite oxide. This is because lithium hydroxide melts even when a firing temperature during preliminary firing is 500° C., and therefore a solid-liquid reaction with the nickel cobalt composite oxide is allowed to uniformly proceed. Further, the kind of nickel cobalt composite compound used as the other raw material of the mixture is not particularly limited, either, but a nickel cobalt composite hydroxide or a nickel cobalt composite oxide is preferred from the viewpoint that a side reaction product other than water is less likely to be generated during reaction.

The nickel cobalt composite hydroxide or the nickel cobalt composite oxide can be produced on the basis of a well-known method. For example, a nickel cobalt composite hydroxide can be generated by coprecipitating nickel, cobalt, and an additional element M. When the obtained nickel cobalt composite hydroxide is further subjected to oxidizing roasting, a nickel cobalt composite oxide can be generated in which cobalt and the additional element M are solid-solved in nickel oxide. It is to be noted that the nickel cobalt composite oxide can be produced also by, for example, a method in which a nickel oxide and an oxide of cobalt or an additional element M are ground and mixed.

In the production method according to the embodiment of the present invention, lithium nickel cobalt composite oxide particles obtained by the final firing are preferably washed with water after cooling. This makes it possible to remove excess lithium on the surfaces of the lithium nickel cobalt composite oxide particles, thereby obtaining a cathode active material for a lithium ion secondary battery having high capacity and high safety. A method for washing the lithium nickel cobalt composite oxide particles with water is not particularly limited, and a well-known technique can be used. For example, when the lithium nickel cobalt composite oxide particles are washed with water, slurry is preferably prepared to have a concentration such that a mass ratio between water and the lithium nickel cobalt composite oxide particles is 1:0.5 to 2, and the slurry is preferably stirred so that excess lithium on the surfaces of the lithium nickel cobalt composite oxide particles can sufficiently be removed. After the washing with water, solid matter obtained by solid-liquid separation performed using a general centrifugal separator or filter press should be dried.

If the slurry has a concentration such that the mass ratio exceeds 2, there is a case where stirring is difficult due to a very high viscosity, and further, the dissolution rate of adhered substances reduces according to equilibrium relation due to a high concentration of alkaline substances in the liquid, or separation from the powder is difficult even when peeling-off occurs. On the other hand, if the slurry has a concentration such that the mass ratio is less than 0.5, the slurry is too dilute, and therefore the elution amount of lithium increases so that de-insertion of lithium from the crystal lattice of the cathode active material also occurs, which is not preferred because the crystal is likely to collapse, and further the high-pH aqueous solution absorbs carbon dioxide in the atmosphere so that lithium carbonate is reprecipitated.

The water used in the washing with water is not particularly limited, but water having an electric conductivity of less than 10 μS/cm is preferred, and water having an electric conductivity of 1 μS/cm or less is more preferred. This is because when water having an electric conductivity of less than 10 μS/cm is used, it is possible to prevent degradation of battery performance caused by adhesion of impurities to the cathode active material. In the solid liquid separation after the washing with water, the amount of adhesion water remaining on the surfaces of the particles as solid matter is preferably small. This is because if the amount of the adhesion water is large, lithium dissolved in the adhesion water is re-precipitated by drying so that the amount of lithium present on the surface of the lithium nickel cobalt composite oxide powder after drying increases.

The temperature of the drying is not particularly limited, but is preferably 80 to 550° C., more preferably 120 to 350° C. The reason why the drying temperature is set to 80° C. or higher is because the cathode active material after washing with water can quickly be dried to prevent the formation of gradient of a lithium concentration between the surfaces of the particles and the insides of the particles. On the other hand, it is supposed that the surface of the cathode active material and its vicinity are in an approximately stoichiometric state or close to a charged state due to slight de-insertion of lithium, and therefore the drying temperature exceeding 550° C. triggers the distortion of crystal structure of the powder close to a charged state which may degrade battery characteristics. The drying temperature is more preferably 120 to 350° C. in consideration of productivity and heat energy cost. A drying method is not particularly limited. For example, a powder cake in a wet state after filtration is preferably subjected to drying treatment at a predetermined temperature within the above-described temperature range using a dryer capable of adjusting an atmosphere to a gas atmosphere containing no carbon and no sulfur or a vacuum atmosphere.

The above-described production method according to the embodiment of the present invention makes it possible to produce lithium nickel cobalt composite oxides different in composition, and they can industrially be used as cathode active materials for lithium ion secondary batteries for various purposes. More specifically, it is possible to produce a lithium nickel cobalt composite oxide represented by a general formula: $Li_zNi_{1-x-y}Co_xM_yO_2$ (wherein M is at least one element selected from among Mn, V, Mg, W, Mo, Nb, Ti, and Al, and x, y, and z satisfy $0<x\leq0.35$, $0\leq y\leq0.35$, $0.97\leq z\leq1.20$, respectively).

(2) Lithium Ion Secondary Battery

Hereinbelow, a specific example of a lithium ion secondary battery will be described which is produced using the above-described cathode active material according to the embodiment of the present invention as a raw material. A lithium ion secondary battery is mainly constituted from a cathode, an anode, a separator, and a non-aqueous electrolyte solution. Existing lithium ion secondary batteries have various shapes, and examples thereof include cylindrical-type lithium ion secondary batteries and stacked-type lithium ion secondary batteries. However, all these lithium ion secondary batteries have a structure in which an electrode assembly having a cathode and an anode opposed to each other with a separator being interposed therebetween is hermetically accommodated in a battery case in a state where the electrode assembly is impregnated with a non-aqueous electrolyte solution. It is to be noted that a current collector of the cathode and a current collector of the anode may respectively be connected to a cathode terminal and an anode terminal which communicate with the outside by current collecting leads or the like. Hereinbelow, each of the cathode, the anode, the separator, and the non-aqueous electrolyte solution will be described.

(a) Cathode

The cathode can be produced by, for example, the following method using the above-described cathode active material according to the embodiment of the present invention. Specifically, the cathode active material in powder form is first mixed with an electrical conductive material and a binding agent, and if necessary, a solvent for, for example, adjusting viscosity or activated carbon that plays the role of increasing electrical double-layer capacity is further added, and they are kneaded to prepare a cathode mixture paste. The mixing ratio among them in the cathode mixture paste is an important factor that determines the performance of a lithium ion secondary battery. For example, it is preferred that, as in the case of the cathode of a general lithium ion secondary battery, a cathode active material content is 60 to 95 mass parts, an electrical conductive material content is 1 to 20 mass parts, and a binding agent content is 1 to 20 mass parts per 100 mass parts of the total mass of solid matter of a cathode mixture except for a solvent.

The obtained cathode mixture paste is applied onto, for example, the surface of a current collector made of aluminum foil and then dried to evaporate the solvent. After the drying, pressing may be performed by a roll press or the like to increase electrode density. In this way, a sheet-shaped cathode can be produced. The obtained sheet-shaped cathode is cut to an appropriate size depending on a desired battery and then incorporated into the battery.

Examples of the electrical conductive material to be used for the cathode mixture paste include graphite (e.g., natural graphite, artificial graphite, expanded graphite) and carbon black-based materials such as acetylene black and Ketjen black (registered trademark). The binding agent plays the role of binding active material particles together, and examples thereof to be used include polyvinylidene fluoride (PVDF), polytetrafluoroethylene (PTFE), fluorine-containing rubber, ethylene propylene diene rubber, styrene butadiene, cellulose-based resins, and polyacrylic acid. It is to be noted that a solvent that plays the role of dispersing these cathode active material, electrical conductive material, and activated carbon added if necessary and dissolving the binding agent may be added to the cathode mixture. As such a solvent, for example, an organic solvent such as N-methyl-2-pyrrolidone may be used.

(b) Anode

As an anode active material contained in the anode, for example, a powdery carbon material such as natural graphite, artificial graphite, a fired body of an organic compound such as a phenolic resin, or coke as well as metallic lithium, a lithium alloy, or the like is mainly used because they can occlude and release lithium ions. The anode can be produced by mixing such an anode active material with an anode binding agent, adding an appropriate solvent thereto to prepare an anode mixture in paste form, applying the anode mixture onto the surface of a metal foil current collector such as copper, drying the applied anode mixture, and, if necessary, compressing the dried anode mixture to increase electrode density. As in the case of the binding agent for the cathode, a fluorine-containing resin such as PVDF may be used similar to the anode binding agent, and the solvent used to disperse the active material and the binding agent may be an organic solvent such as N-methyl-2-pyrrolidone.

(c) Separator

The separator interposed between the cathode and the anode plays the role of separating the cathode and the anode to prevent short circuit and the role of holding an electrolyte to provide ion conductivity. As a material of such a separator, a porous membrane is used which is in the form of a thin film made of polyethylene, polypropylene, or the like and has a plurality of micro pores.

(d) Non-Aqueous Electrolyte

A non-aqueous electrolyte to be used may be a non-aqueous electrolyte solution, and an example thereof includes a non-aqueous electrolyte solution obtained by dissolving a lithium salt as a supporting salt in an organic solvent. Alternatively, the non-aqueous electrolyte solution to be used may be one obtained by dissolving a lithium salt in an ionic liquid. It is to be noted that the ionic liquid refers to a salt that is constituted from a cation other than lithium ion and an anion and is in liquid form even at ordinary temperature.

Examples of the organic solvent include cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate, and they may be used singly or in combination of two or more of them.

Examples of the supporting salt to be used include $LiPF_6$, $LiBF_4$, $LiClO_4$, $LiAsF_6$, and $LiN(CF_3SO_2)_2$ and combined salts thereof. It is to be noted that the non-aqueous electrolyte solution may contain a radical scavenger, a surfactant, a flame retardant, etc. to improve battery characteristics.

Alternatively, the non-aqueous electrolyte to be used may be a solid electrolyte. The solid electrolyte has the property of being able to withstand high voltage. Examples of the solid electrolyte include an inorganic solid electrolyte and an organic solid electrolyte. As the inorganic solid electrolyte, an oxide-based solid electrolyte, a sulfide solid electrolyte, or the like is used.

The oxide-based solid electrolyte is not particularly limited as long as it contains oxygen (O) and has lithium ion conductivity and electron insulation properties, and examples of such an oxide-based solid electrolyte include lithium phosphate ($Li_3PO_4$), $Li_3PO_4NX$, $LiBO_2NX$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—ZnO, $Li_{1+x}Al_xTi_{2-x}(PO_4)_3$ (0≤X≤1), $Li_{1+x}Al_xGe_{2-x}(PO_4)_3$ (0≤X≤1), $LiTi_2(PO_4)_3$, $Li_{3x}La_{2/3-x}TiO_3$ (0≤X≤2/3), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$.

On the other hand, the sulfide solid electrolyte is not particularly limited as long as it contains sulfur (S) and has lithium ion conductivity and electron insulation properties, and examples of such a sulfide solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$.

It is to be noted that the inorganic solid electrolyte to be used may be one other than the above-mentioned examples. For example, $Li_3N$, $LiI$, $Li_3N$—$LiI$—$LiOH$, or the like may be used. The organic solid electrolyte is not particularly limited as long as it is a high polymer compound having ionic conductivity, and examples thereof to be used include polyethylene oxide, polypropylene oxide, and copolymers of them. Further, the organic solid electrolyte may contain a supporting salt (lithium salt).

(d) Non-Aqueous Electrolyte Solution

As the non-aqueous electrolyte solution, one obtained by dissolving a lithium salt as a supporting salt in an organic solvent is used. Examples of the organic solvent include cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate, and they may be used singly or in combination of two or more of them. Examples of the supporting salt to be used include $LiPF_6$, $LiBF_4$, $LiClO_4$, $LiAsF_6$, and $LiN(CF_3SO_2)_2$ and combined salts of any one of them. The non-aqueous electrolyte solution may further contain a radical scavenger, a surfactant, a flame retardant, etc.

(e) Lithium Ion Secondary Battery

A coin-type battery will be described as a specific example of a lithium ion secondary battery mainly constituted from the above-described cathode, anode, separator, and non-aqueous electrolyte solution. As shown in FIG. 1, a coin-type battery (e.g., a 2032-type coin-type battery) includes a cathode can 1 having an almost cylindrical shape and an open upper end, an anode can 2 having an almost cylindrical shape, an open lower end, and a size such that it can be fitted into the cathode can 1, a separator 3, and a pair of a cathode 4 and an anode 5 opposed to each other. The cathode 4 and the anode 5 are stacked with the separator 3 being interposed therebetween and accommodated in a cavity formed by fitting the cathode can 1 and the anode can 2 together in such a manner that their open ends are opposed to each other. The cathode 4 abuts against the inner surface of the cathode can 1, and the anode 5 abuts against the inner surface of the anode can 2. Further, a gasket 6 is provided between the periphery of the cathode can 1 and the periphery of the anode can 2. The gasket 6 plays the role of keeping an insulating state and hermetically sealing the inside of the battery.

(f) Characteristics

The above-described lithium ion secondary battery using the cathode active material according to the embodiment of the present invention has high capacity and high output. For example, when the cathode active material according to the embodiment of the present invention is used for the cathode of the above-described 2032-type coin-type battery, a high initial discharge capacity of 165 mAh/g or more and low cathode resistance can be achieved. Further, it can be said that the battery is excellent also in safety because high thermal stability is achieved. It is to be noted that the cathode resistance can be measured by, for example, the following method.

When the frequency dependence of a battery reaction is measured by an AC impedance method generally used as an electrochemical evaluation method, a Nyquist diagram based on solution resistance, anode resistance and anode capacity, and cathode resistance and cathode capacity is obtained. The battery reaction at an electrode includes a resistance component associated with charge transfer and a capacity component of an electric double layer. When these components are represented using an electric circuit, the electric circuit is a parallel circuit of resistance and capacity, and the entire of a battery is represented as an equivalent circuit in which solution resistance, a parallel circuit of an anode, and a parallel circuit of a cathode are connected in series. Each of the resistance components and the capacity components can be estimated by performing fitting calculation on the measured Nyquist diagram using this equivalent circuit. The cathode resistance is equal to the diameter of a semicircle on the lower frequency side in the obtained Nyquist diagram.

EXAMPLES

Example 1

A nickel composite hydroxide was prepared by a well-known method (neutralizing crystallization). Fifty liters of pure water and 10 L of 25 mass % ammonia water were placed in a neutralizing crystallization reaction tank made of stainless steel and having an effective volume of 60 liters, and the pH of a reaction solution in the reaction tank was kept at 13.0 at a liquid temperature of 25° C. with a 20 mass % sodium hydroxide solution while the liquid temperature of the reaction solution was adjusted to 49.5° C. A mixed aqueous solution of nickel sulfate and cobalt sulfate, an aqueous sodium aluminate solution, and 25 mass % ammonia water were continuously added to the initial reaction solution to precipitate nickel cobalt composite hydroxide particles, and the nickel cobalt composite hydroxide particles were collected by overflow. It is to be noted that the crystallization was performed while the pH in the reaction tank was adjusted to 12.0 to 13.0 at 25° C. so that the nickel composite hydroxide collected by overflow had a desired volume average particle diameter MV. The collected particles were washed with a 45 g/L aqueous sodium hydroxide solution having a pH of 12.5 at a liquid temperature of 25° C., then washed with water, and dried to obtain a nickel cobalt composite hydroxide.

The obtained nickel cobalt composite hydroxide was composed of spherical secondary particles each of which was formed by aggregation of a plurality of primary particles of 1 μm or less. As a result of analysis by the ICP method, the amount-of-substance ratio of Ni:Co:Al of the nickel cobalt composite hydroxide was confirmed to be 91:6:3. The volume average particle diameter MV of the nickel cobalt composite hydroxide as measured by a laser diffraction and scattering method was 11.2 μm.

Then, the nickel cobalt composite hydroxide was fired in air to obtain a nickel cobalt composite oxide. The obtained nickel cobalt composite oxide had a volume average particle diameter MV of 10.7 μm as measured by a laser diffraction and scattering method and a specific surface area of 41.2 $m^2$/g as measured by the BET method. The nickel cobalt composite oxide was mixed with lithium hydroxide so that Li/(Ni+Co+Al)=1.025 in terms of amount of substance. The bulk density of the obtained mixture was determined by a method in which the mass of the mixture placed in a 1-L constant-volume measuring cup was measured, and was found to be about 0.8 g/mL.

Then, the mixture of the nickel cobalt composite oxide and lithium hydroxide was divided into smaller proportions and placed in 9 firing containers. Three of these proportions were subjected to preliminary firing by being maintained at firing temperatures of 500° C., 550° C., and 600° C., respectively for 30 minutes. Another three proportions were subjected to preliminary firing by being maintained at firing temperatures of 500° C., 550° C., and 600° C., respectively for 1 hour. The remaining three proportions were subjected to preliminary firing by being maintained at firing temperatures of 500° C., 550° C., and 600° C., respectively for 5 hours. It is to be noted that in every case, the preliminary firing was performed in a gas flow atmosphere where an oxygen concentration of 80 vol % was maintained. The firing temperature was measured by a thermocouple provided in the firing container so as to be in contact with the mixture.

In this way, spherical precursor particles made of a lithium nickel cobalt composite oxide were prepared as samples 1 to 9. The obtained spherical precursor particles of the samples 1 to 9 were subjected to laser diffraction/scattering measurement to determine their volume average particle diameters MV, and subjected to XRD measurement to determine their (003) crystallite diameters. Further, image analysis was performed on the SEM photograph of particle surfaces using image analysis software (Image-j) by binarizing the contrast of images of particle surfaces to calculate the area ratio of portions covered with a substance unevenly distributed in a patchy fashion on the particle surfaces. It is to be noted that the area ratio is determined as the average of area ratios of 7 particles randomly selected. Further, the substance unevenly distributed in a patch fashion on the surfaces of the spherical precursor particles was analyzed by semi-quantitative elemental analysis with EPMA-EDX. As a result, lithium was detected as a main component, and other elements such as nickel, cobalt, and aluminum were not detected or detected only in minute quantities, and therefore the unevenly-distributed substance was found to be not a lithium nickel cobalt aluminum composite oxide but a lithium compound. The volume average particle diameters MV, the crystallite diameters, and the area ratios of portions covered with a lithium compound are shown in the following Table 1 together with preliminary firing conditions. Further, the SEM image of precursor particles of the sample 5 is shown in FIG. 2 as a representative.

Then, the spherical precursor particles of the samples 1 to 9 obtained above were placed in an electric furnace and subjected to final firing by being maintained at a firing temperature of 745° C. for 3 hours in an atmosphere having an oxygen concentration of 80 vol %. After the final firing, pure water at 20° C. was added to the obtained particles to prepare a slurry containing 750 g of the particles per 1 liter of water, and this slurry was stirred for 20 minutes and then passed through a filter press for dehydration. Then, the particles were subjected to static drying for 10 hours using a vacuum dryer heated to achieve an atmosphere temperature of 190° C. Finally, the particles were passed through a sieve having an opening size of 53 µm to obtain a cathode active material. The composition of the obtained cathode active material was analyzed by the ICP method, and as a result the amount-of-substance ratio of Ni:Co:Al:Li was confirmed to be 0.91:0.06:0.03:0.99. Further, XRD measurement was performed to determine a crystallite diameter from the full width at half maximum, FWHM of diffraction peak of (003) plane by using Sherrer formula and to determine a lithium site occupancy by Rietveld analysis of an XRD pattern. The results are shown in the following Table 1.

For comparison, spherical precursor particles as a sample 10 were formed in the same manner as in the case of the sample 4 except that the preliminary firing temperature was changed to 450° C., and spherical precursor particles as a sample 11 were formed in the same manner as in the case of the sample 4 except that the preliminary firing temperature was changed to 650° C. The samples 10 and 11 were subjected to final firing in the same manner as in the case of the sample 4 to obtain cathode active materials. The SEM image of precursor particle surfaces of the sample 10 and the SEM image of precursor particle surfaces of the sample 11 are shown in FIG. 3 and FIG. 4, respectively. Further, a cathode active material as a sample 12 was obtained in the same manner as in the case of the sample 1 except that the preliminary firing was omitted.

[Battery evaluation]

Each of the cathode active materials of the samples 1 to 12 obtained above was used to produce such a coin-type battery as shown in FIG. 1, and the initial discharge capacity, the charge and discharge efficiency, and the cathode resistance thereof were evaluated. Specifically, 52.5 mg of the cathode active material of each of the samples, 15 mg of acetylene black, and 7.5 mg of polytetrafluoroethylene resin (PTFE) were mixed and press-molded at a pressure of 100 MPa to achieve a diameter of 11 mm and a thickness of 100 µm. In this way, a cathode 4 was produced. The produced cathode 4 was placed in a vacuum dryer whose atmosphere temperature was 120° C. and dried for 12 hours. A coin-type battery shown in FIG. 1 was produced using this cathode 4, an anode 5, a separator 3, and an electrolyte solution in a glove box filled with an Ar atmosphere whose dew point was controlled at −80° C. It is to be noted that the anode 5 was a disc-shaped anode having a diameter of 17 mm and a thickness of 1 mm obtained by punching a lithium metal foil.

The separator 3 was a polyethylene porous membrane having a thickness of 25 µm. The electrolyte solution was a mixed solution of equal parts of ethylene carbonate (EC) and diethyl carbonate (DEC) using 1M $LiClO_4$ as a supporting electrolyte (manufactured by Toyama Pure Chemical Industries, Ltd.). The initial discharge capacity, the charge and discharge efficiency, and the cathode resistance as indicators of the battery performance of the thus produced coin-type battery were evaluated in the following manner.

The initial discharge capacity was evaluated in the following manner. The coin-type battery was allowed to stand for about 24 hours after production. After the open circuit voltage (OCV) of the coin-type battery was stabilized, a current density for the cathode was set to 0.1 $mA/cm^2$, and the coin-type battery was charged to a cutoff voltage of 4.3 V. After a 1-hour pause, the coin-type battery was discharged to a cutoff voltage of 3.0 V, and the capacity of the coin-type battery at this time was defined as an initial discharge capacity. The charge and discharge efficiency was determined by dividing the initial discharge capacity by initial charge capacity.

The cathode resistance was evaluated in the following manner. The coin-type battery was charged at a charging potential of 4.1 V and subjected to measurement by an AC impedance method using a frequency response analyzer and a potentiogalvanostat (manufactured by Solartron, 1255B) to obtain a Nyquist plot. The Nyquist plot is expressed as the sum of characteristic curves showing solution resistance, anode resistance and anode capacity, and cathode resistance and cathode capacity. Therefore, fitting calculation was performed using an equivalent circuit on the basis of the Nyquist plot to calculate the value of cathode resistance. Here, the cathode resistance was expressed as a relative value obtained by dividing it by the measured value of a reference sample. The results are shown in the following Table 1.

TABLE 1

| | Preliminary firing conditions | | Precursor particles | | | Cathode active material | | Battery characteristics | | |
|---|---|---|---|---|---|---|---|---|---|---|
| Samples | Temperature [° C.] | Time [hr] | Volume average particle diameter [mµ] | Crystallite diameter [Å] | Area ratio [%] | Crystallite diameter [Å] | Li site occupancy [%] | Initial discharge capacity [mAh/g] | Charge and discharge efficiency [%] | Cathode resistance |
| 1 | 500 | 0.5 | 10.8 | 75 | 4.4 | 1180 | 98.4 | 206 | 91 | 1.6 |
| 2 | 550 | 0.5 | 10.8 | 91 | 3.5 | 1320 | 98.5 | 206 | 92 | 1.5 |
| 3 | 600 | 0.5 | 10.7 | 114 | 2.1 | 1330 | 98.5 | 207 | 91 | 1.5 |
| 4 | 500 | 1 | 10.7 | 100 | 2.2 | 1360 | 98.5 | 205 | 90 | 1.6 |
| 5 | 550 | 1 | 10.8 | 107 | 2.0 | 1410 | 98.5 | 208 | 91 | 1.6 |
| 6 | 600 | 1 | 10.7 | 155 | 1.8 | 1390 | 98.4 | 207 | 91 | 1.5 |
| 7 | 500 | 5 | 10.5 | 142 | 3.2 | 1420 | 98.6 | 206 | 91 | 1.5 |
| 8 | 550 | 5 | 10.6 | 180 | 3.9 | 1500 | 99.0 | 208 | 92 | 1.6 |
| 9 | 600 | 5 | 10.6 | 198 | 4.7 | 1550 | 98.7 | 206 | 91 | 1.6 |
| *10 | 450 | 1 | 10.7 | 94 | 18.0 | 1370 | 98.1 | 205 | 88 | 1.8 |
| *11 | 650 | 1 | 10.6 | 258 | 8.3 | 1510 | 98.5 | 206 | 89 | 1.5 |
| *12 | — | — | — | — | — | 1280 | 97.5 | 198 | 86 | 2.4 |

Note:
Samples marked with * in the table are comparative examples.

[Evaluation]

As can be apparent from the above Table 1, all the spherical precursor particles of the samples 1 to 9 after preliminary firing have an area ratio of a surface covered with a lithium compound of 5% or less, and all the cathode active materials obtained by subjecting the spherical precursor particles of the samples 1 to 9 to final firing have a higher charge and discharge efficiency than the samples 10 to 12 as comparative examples and have an initial discharge capacity at the same level as or slightly higher than those of the samples 10 to 12. On the other hand, the samples 10 and 12 have a higher cathode reaction resistance than the samples 1 to 9. That is, when the surfaces of the precursor particles after preliminary firing are covered with a lithium compound at an area ratio exceeding 5% as in the case of the samples 10 and 11, the cathode active material obtained by subjecting such precursor particles to final firing tends to have low initial discharge capacity, low charge and discharge efficiency, and high cathode reaction resistance. It is considered that spherical precursor particles in which melted LiOH is more uniformly penetrated into the nickel cobalt composite oxide particles are obtained by performing preliminary firing under such appropriate firing conditions as described above, and a cathode active material having a uniform Li abundance ratio and excellent battery characteristics can be obtained by subjecting such spherical precursor particles as a starting material to final firing.

On the other hand, it is considered that when melted LiOH is locally present on the surfaces of the nickel cobalt composite oxide particles as in the case of the samples 10 and 11 as comparative examples, a precursor in which LiOH is non-uniformly penetrated and reacted is obtained, and therefore even when such a precursor as a starting material is subjected to final firing, uniformity of a Li abundance ratio is inferior to that of the cathode active materials produced from the precursors of the samples 1 to 9 so that the battery characteristics are poor. In the case of the cathode active material of the sample 12 produced without performing preliminary firing, it is considered that uneven distribution of LiOH on the surfaces of particles of the nickel cobalt composite oxide was particularly remarkable so that the battery characteristics significantly degraded.

FIG. 5 shows a graph obtained by plotting the crystallite diameter [Å] and the lithium site occupancy [%} of each of the cathode active materials of the samples 1 to 12. It is to be noted that numerals written near individual dots in FIG. 5 are sample numbers. As can be seen from the result shown in FIG. 5, a cathode active material satisfying the following relational expression 2 wherein a represents a crystallite diameter [Å] and b represents a lithium site occupancy [%] is preferably used.

$$b \geq 0.0019a + 95.8 \quad \text{[Formula 2]}$$

Example 2

Spherical precursor materials of samples 13 and 14 were produced in the same manner as in the case of the sample 5 in Example 1 except that a manganese compound and a titanium compound were used instead of sodium aluminate, respectively when a nickel cobalt composite hydroxide was produced by neutralizing crystallization, and these spherical precursor materials were subjected to final firing in the same manner as in the case of the sample 5 to obtain cathode active materials. It is to be noted that the mixture was prepared so that Li/(Ni+Co+Mn)=1.025 or Li/(Ni+Co+Ti)=1.025 in terms of the amount of substance. As a result, as shown in the following Table 2, in both cases, battery characteristics substantially the same as those of the sample 5 were achieved.

TABLE 2

| | Preliminary firing conditions | | Precursor particles | | | Cathode active material | | Battery characteristics | | |
|---|---|---|---|---|---|---|---|---|---|---|
| Samples | Temperature [° C.] | Time [hr] | Volume average particle diameter [mμ] | Crystallite diameter [Å] | Area ratio [%] | Crystallite diameter [Å] | Li site occupancy [%] | Initial discharge capacity [mAh/g] | Charge and discharge efficiency [%] | Cathode resistance |
| 13 | 550 | 1 | 10.4 | 65 | 4.6 | 1067 | 98.3 | 201 | 90 | 1.7 |
| 14 | 550 | 1 | 10.5 | 112 | 2.3 | 1370 | 98.6 | 207 | 91 | 1.6 |

Example 3

A spherical precursor material of a sample 15 was produced in the same manner as in the case of the sample 5 in Example 1 except that when a nickel cobalt composite hydroxide was produced by neutralizing crystallization, crystallization was performed while the pH in the reaction tank was adjusted to 12.5 to 13.5 at 25° C., and a spherical precursor material of a sample 16 was produced in the same manner as in the case of the sample 5 in Example 1 except that when a nickel cobalt composite hydroxide was produced by neutralizing crystallization, crystallization was performed while the pH in the reaction tank was adjusted to 11.0 to 12.0 at 25° C. Then, these spherical precursor materials were subjected to final firing in the same manner as in the case of the sample 5 to obtain cathode active materials. As a result, as shown in the following Table 3, in both cases, battery characteristics substantially the same as those of the sample 5 were achieved.

TABLE 3

| | Precursor particles | | | | Cathode active material | | Battery characteristics | | |
|---|---|---|---|---|---|---|---|---|---|
| | Preliminary firing conditions | | Volume average particle diameter [mμ] | Crystallite diameter [Å] | Area ratio [%] | Crystallite diameter [Å] | Li site occupancy [%] | Initial discharge capacity [mAh/g] | Charge and discharge efficiency [%] | Cathode resistance |
| Samples | Temperature [° C.] | Time [hr] | | | | | | | | |
| 15 | 550 | 1 | 8.2 | 112 | 1.8 | 1220 | 98.9 | 210 | 91 | 1.5 |
| 16 | 550 | 1 | 27.3 | 105 | 3.3 | 1370 | 98.3 | 206 | 90 | 1.6 |

REFERENCE SIGNS LIST

1 Cathode can
2 Anode can
3 Separator
4 Cathode
5 Anode
6 Gasket

The invention claimed is:

1. Spherical particles made of a lithium nickel cobalt composite oxide represented by a general formula: $Li_z Ni_{1-x-y}Co_xM_yO_2$,
wherein M is at least one element selected from among Mn, V, Mg, W, Mo, Nb, Ti, and Al and x, y, and z satisfy $0<x\leq0.35$, $0\leq y\leq0.35$, and $0.97\leq z\leq1.20$, respectively,
wherein the spherical particles are produced by preliminary firing having a firing temperature within a range of 550° C. or higher and 600° C. or lower in an oxidizing atmosphere having an oxygen concentration of 80 vol % or more,
wherein an area ratio of lithium hydroxide and/or lithium carbonate unevenly distributed on surfaces of the particles as compared to the area of the particles as a whole in a SEM image is 5% or less, and
wherein a crystallite diameter of the particles determined from a full width at half maximum, FWHM of diffraction peak of (003) plane obtained by X ray diffraction by using Sherrer formula is in a range of 50 to 200 Å.

2. The spherical particles made of a lithium nickel cobalt composite oxide according to claim 1, which are a precursor.

3. The spherical particles made of a lithium nickel cobalt composite oxide according to claim 1, whose volume average particle diameter MV is in a range of 8 to 30 μm.

4. The spherical particles made of a lithium nickel cobalt composite oxide according to claim 2, whose volume average particle diameter MV is in a range of 8 to 30 μm.

* * * * *